US010822265B2

(12) United States Patent
Fotheringham et al.

(10) Patent No.: US 10,822,265 B2
(45) Date of Patent: Nov. 3, 2020

(54) GLASSES HAVING IMPROVED HYDROLYTIC AND ALKALI RESISTANCE

(71) Applicant: Schott AG, Mainz (DE)

(72) Inventors: Ulrich Fotheringham, Wiesbaden (DE); Michael Schwall, Mainz (DE); Simone Ritter, Mainz (DE); Peter Naß, Mainz (DE); Christof Kass, Tirschenreuth (DE); Christoph Berndhäuser, Nieder-Olm (DE); Christoph Groß, Mainz (DE)

(73) Assignee: Schott AG, Mainz (DE)

( * ) Notice: Subject to any disclaimer, the term of this patent is extended or adjusted under 35 U.S.C. 154(b) by 93 days.

(21) Appl. No.: 15/892,029

(22) Filed: Feb. 8, 2018

(65) Prior Publication Data

US 2018/0222791 A1 Aug. 9, 2018

(30) Foreign Application Priority Data

Feb. 8, 2017 (DE) .................... 10 2017 102 485

(51) Int. Cl.
*C03C 3/091* (2006.01)
*C03C 4/20* (2006.01)
*C03C 3/093* (2006.01)

(52) U.S. Cl.
CPC .............. *C03C 3/091* (2013.01); *C03C 3/093* (2013.01); *C03C 4/20* (2013.01); *C03C 2203/10* (2013.01); *C03C 2203/50* (2013.01)

(58) Field of Classification Search
CPC ................................................. C03C 3/091
See application file for complete search history.

(56) References Cited

U.S. PATENT DOCUMENTS

| | | | |
|---|---|---|---|
| 5,599,753 A | 2/1997 | Watzke et al. | |
| 2018/0222790 A1* | 8/2018 | Fotheringham | C03C 3/091 |

FOREIGN PATENT DOCUMENTS

| | | |
|---|---|---|
| DE | 195 15 608 C1 | 8/1996 |
| DE | 10 2004 023 732 A1 | 12/2005 |
| DE | 10 2014 101 756 A1 | 8/2015 |
| DE | 10 2014 119 594 A1 | 6/2016 |
| EP | 1 314 704 A1 | 5/2003 |
| FR | 2 936 794 | 4/2010 |
| JP | 2005037651 A | 2/2005 |
| WO | 2015/111524 A1 | 7/2015 |
| WO | 2016/088788 A1 | 6/2016 |

OTHER PUBLICATIONS

German Office Action dated Sep. 20, 2017 for German Application No. 10 2017 102 485.9 (5 pages).

"On determining chemical durability of glasses", Susanne Fagerlund, Paul Ek, Mikko Hupa & Leena Hupa, Glass Technology: European Journal of Glass Science and Technology, Part A, vol. 51, No. 6, pp. 235-240, Dec. 2010 (6 pages).
"Bauchemie für das Bachelorstudium", Roland Benedix, Springer Vieweg, Wiesbaden, p. 129, 2014 (5 pages).
"Chemical structure, medium range order, and crystalline reference state of multicomponent oxide liquids and glasses", Reinhard Conradt, Journal of Non-Crystalline Solids, vols. 345-346, pp. 16-23, Oct. 15, 2004 (8 pages).
"Dissociation Constants of Inorganic Acids and Bases in Aqueous Solution", D.D. Perrin, Pure Appl. Chem., vol. 20, No. 2, digit 176, digit 15, digit 12, digit 115, digit 18, digit 180, digit 178, digit 164, 1969, pp. 133-236, (104 pages).
Water Treatment Unit Processes: Physical and Chemical, David W. Hendricks, Taylor and Francis Group, Boca Raton, London, New York, p. 307, 2006 (18 pages).
"The biological inorganic chemistry of zinc ions", Artur Krezel and Wolfgang Maret, Archives of Biochemistry and Biophysics, p. 1-17, (2016) (17 pages).
"On the glass transition in vitreous silica by differential thermal analysis measurements", Ralf Brüning, Journal of Non-Crystalline Solids 330, p. 13-22, 2003 (10 pages).
"First-Principles Ionicity Scales", Alberto Garcia and Marvin L. Cohen, Physical Review B, vol. 47, No. 8, Feb. 15, 1993 (6 pages).
H. Föll, lecture notes of the lecture "Einführung in die Materialwissenschaft I", Christian Albrechts University Kiel, pp. 79-83 (415 pages).
"Crystal Structure of Reedmergnerite, A Boron Albite, and It's Relation to Feldspar Crystal Chemistry", Daniel E. Appleman and Joan R. Clark, The American Mineralogist, vol. 50, pp. 1827-1850, 1965 (24 pages).
"The coordination numbers of Na and K atoms in low albite and microline as determined from a procrystal electron-density distribution", Robert T. Downs, Aaron Andalman and Marc Hudacsko, American Mineralogist, vol. 81, pp. 1344-1349, 1996 (6 pages).
"Immiscibility in Silicate Melts", J.W. Greig, American Journal of Science, 5th Series, vol. 13, pp. 1-44 and 133-154, 1927 (67 pages).
"Crystal structure of KBSi3O8 isostructural with danburite", Mitsuyoshi Kimata, Mineralogical Magazine, vol. 57, pp. 157-164, Mar. 1993 (8 pages).
"The Crystal Structure of Danburite: A Comparison with Anorthite, Albite, and Reedmergnerite", Michael W. Phillips, G.V. Gibbs, and P.H. Ribbe, American Mineralogist, vol. 59, pp. 79-85, 1974 (7 pages).
"Structural effects of the incorporation of large-radius alkalis in high cordierite", Peter Daniels, American Mineralogist, vol. 77, pp. 407-411, 1992 (5 pages).
"Maleevite BaB2Si2O8, and Pekovite, SrB2Si2O8, New Mineral Species From the Dara-I-Pioz Alkaline Massif, Northern Tajikistan: Description and Crystal Structure", Leonid A. Pautov, Atali A. Agakhanov, Elena Sokolova and Frank C. Hawthorne, The Canadian Mineralogist vol. 42, pp. 107-119, 2004 (13 pages).

(Continued)

*Primary Examiner* — Elizabeth A. Bolden
(74) *Attorney, Agent, or Firm* — Taylor IP, P.C.

(57) ABSTRACT

A glass having a good hydrolytic resistance and alkali resistance is defined by a targeted combination of stoichiometric glasses, including glasses also existing as crystals in the same stoichiometry and whose properties can be assumed as being very similar due to the identical topology of the structural units for glass and crystal, respectively. A process of producing the glasses is also provided.

25 Claims, No Drawings

(56) References Cited

OTHER PUBLICATIONS

"Introduction into Glass Science and Technology", J.E. Shelby, Structures of Glasses, Royal Society of Chemistry, Cambridge, UK, p. 93, 2005 (20 pages).
"Chemische Aspekte bei Verdampfungsvorgängen aus Borosilicatglasschmelzen, Part III", C. Pentzel, D. Höhne, Sprechsaal, vol. 124, No. 5, pp. 327-329, 1991 (3 pages).
"Fundamental Condition of Glass Formation", Kuan-Han Sun, Journal of The American Ceramic Society, vol. 30, No. 9, pp. 277-281, 1947 (5 pages).
"Die Kationenfeldstärken und ihre Beziehungen zu Entglasungsvorgängen, zur Verbindungsbildung und zu den Schmelzpunkten von Silicaten", Von A. Dietzel, Berichte der Bunsengesellschaft für physikalische Chemie vol. 48 No. 1, pp. 9-23, 1942 (15 pages).
"Revised Effective Ionic Radii and Systematic Studies of Interatomic Distances in Halides and Chalcogenides", R.D. Shannon, Acta Cryst. A32, pp. 751-767, 1976 (17 pages).
European Search Report dated Jun. 29, 2018 for European Patent Application No. 18 15 5777 (5 pages).
European Office Action dated Apr. 26, 2019 for European Patent Application No. 18 15 5777 (7 pages).

\* cited by examiner

GLASSES HAVING IMPROVED HYDROLYTIC AND ALKALI RESISTANCE

BACKGROUND OF THE INVENTION

1. Field of the Invention

The invention relates to glasses and glass products, and more particularly, to glasses and glass products having a combination of good alkali and hydrolytic resistance and advantageous thermal expansion properties, and production processes for such glasses and uses thereof.

2. Description of the Related Art

Glasses having good hydrolytic and alkali resistance are required for many applications, in particular for applications in the field of "pharmaceutical packaging". Generally, a certain thermal expansion coefficient is requested as well. This thermal expansion coefficient should be as homogeneous as possible in view of potential thermal post-processing. That means that the thermal expansion coefficient should be very similar or equal in the interior of the glass and at the surface. There are numerous instructions and standards for characterizing the hydrolytic and alkali resistance, in particular ISO 719/720 for hydrolytic resistance and ISO 695 for alkali resistance.

DE 10 2014 119 594 A1 discloses glasses that are also determined for uses in the pharmaceutical field. However, the glasses described therein have only small amounts of reedmergnerite so that advantageous resistance properties combined with advantageous thermal expansion cannot be achieved.

In the art, there is a lack of glasses which combine good hydrolytic resistance with a low ablation rate in the test of alkali resistance according to ISO 695. Additionally, these glasses should have advantageous thermal expansion properties. The glasses should also be able to be produced in modern tube draw production processes.

SUMMARY OF THE INVENTION

In accordance with an aspect of the present invention, there is provided a glass having a composition of constituent phases, and the constituent phases include reedmergnerite from 10 to 80 mol %, albite from 1 to 40 mol %, potassium reedmergnerite from 0 to 60 mol %, danburite from 0 to 30%, cordierite from 0 to 20%, willemite from 0 to 20%, silicon dioxide from 0 to 65%, diboron trioxide from 0 to 20%, pekovite from 0 to 20%, and maleevite from 0 to 25%.

In accordance with another aspect of the present invention, there is provided a process for producing a glass, including melting a plurality of glass raw materials to form a glass melt and cooling the glass melt. The plurality of glass raw materials include reedmergnerite from 10 to 80 mol %, albite from 1 to 40 mol %, potassium reedmergnerite from 0 to 60 mol %, danburite from 0 to 30%, cordierite from 0 to 20%, willemite from 0 to 20%, silicon dioxide from 0 to 65%, diboron trioxide from 0 to 20%, pekovite from 0 to 20%, and maleevite from 0 to 25%.

In accordance with another aspect of the present invention, there is provided a glass for use in packaging. The glass has a composition of constituent phases, and the constituent phases include reedmergnerite from 10 to 80 mol %, albite from 1 to 40 mol %, potassium reedmergnerite from 0 to 60 mol %, danburite from 0 to 30%, cordierite from 0 to 20%, willemite from 0 to 20%, silicon dioxide from 0 to 65%, diboron trioxide from 0 to 20%, pekovite from 0 to 20%, and maleevite from 0 to 25%.

DETAILED DESCRIPTION OF THE INVENTION

Both hydrolytic resistance according to ISO 719/720 and alkali resistance according to ISO 695 basically involve resistance of the glass against attack by hydroxide ions. In case of ISO 695 the concentration of hydroxide ions is determined by use of a buffer solution having 0.5 mol/l sodium hydroxide and 0.25 mol/l sodium carbonate. In case of ISO 719/720 the glass is placed into neutral water, whose pH-value is initially adjusted to pH 5.5 (examination by methyl red indicator solution) and is then rapidly turning into the alkaline region by dissolution of the glass. A buffer solution is formed from the weak acids (or acid anhydrides) contained in the glass, namely silicic acid and boric acid, and strong bases (as for example sodium hydroxide), the pH of the solution being in the range of from 9 to 10 (see Susanne Fagerlund, Paul Ek, Mikko Hupa and Leena Hupa: On deter-mining chemical durability of glasses, Glass Technol.: Eur. J. Glass Sci. Technol. A, December 2010, 51 (6), 235-240, incorporated herein in its entirety by reference). Decisive for the pH of a buffer solution are the pKa-values of the weak acid(s), wherein the pKa-value of boric acid is about 0.5 lower than the pKa-value of orthosilicic acid; the latter is the type of silicic acid appearing in dilute solutions (see Roland Benedix, Bauchemie für das Bachelorstudium, Springer Vieweg, Wiesbaden, 2014, p. 129, incorporated herein in its entirety by reference). The concentration of hydroxide ions is determined by the pH-value of the formed buffer solution, which is dependent on the glass type and increases with progressing dissolution. The dissolution caused by these hydroxide ions takes place according to the same mechanism as in the test of alkali resistance.

Thus, firstly the ablation rate in the test according to ISO 695 has to be set to a low value in order to make a glass both alkali resistant and hydrolytic resistant. Secondly, the pH-value has to be limited that results during a test according to ISO 719/720 and the dissolution of a certain amount of glass associated therewith. The higher the pH-value rises during the test, the higher is the risk of a positive feedback effect: the ablation rate increases with increasing pH, and the pH-value is in turn in-creasing with increasing amount of ablated material.

During the test, chemically resistant glasses (hydrolytic class HGB I according to ISO 719) typically experience an ablation that results in 100 μmol or less glass in the aqueous solution, wherein the ablation generally is all the less congruent the smaller the ablation is.

As a comparison of glasses has to refer to a fixed relationship, the relevant pH is defined herein as the pH that results from dissolution of 50 μmol glass in neutral water, wherein the dissolution is assumed to be congruent. Embodiments of the invention relate to glasses at which this pH is less than 8.99, preferably less than 8.89, preferably less than 8.79 and particularly preferably 8.7 or less.

In accordance with embodiments of the present invention the ablation rate according to ISO 695 is at most 135 mg/(dm$^2$3 h), at most 125 mg/(dm$^2$3 h), at most 115 mg/(dm$^2$3 h), at most 105 mg/(dm$^2$3 h), preferably at most 95 mg/(dm$^2$3 h), preferably at most 85 mg/(dm$^2$3 h), particularly preferably at most 75 mg/(dm$^2$3 h). The latter number defines the border between alkali classes 1 and 2 according to ISO 695. This refers to the ablation rate that can be calculated according to formulas (2) and (3) for glasses of the invention.

In accordance with embodiments of the invention the thermal expansion coefficient is preferably between 3 and 7 ppm/K, preferably between 4 and 6 ppm/K, particularly preferably between 4.5 and 5.5 ppm/K. This refers to the CTE value that can be calculated according to formula (5) for glasses of this invention. It is particularly advantageous for forming the glasses of the invention into desired shapes if the values of the thermal expansion coefficient are within the ranges indicated above. High CTE values are associated with increased cooling stress and may thus necessitate particularly effortful cooling regimes. On the other hand, low CTE values are associated with increased melting points which in turn increase the production effort. Therefore, it is advantageous to keep the values of the thermal expansion coefficient within the ranges indicated above.

This may be achieved by a targeted combination of stoichiometric glasses, i.e. glasses which also exist as crystals in the same stoichiometry and whose property can be assumed to be very similar in each case for glass and crystal because of the identical topology of the structural components, as has been examined in the literature in many examples by means of NMR measurements or the like. For this purpose, stoichiometric glasses are selected which can be combined to obtain a behaviour according to embodiments of the invention. In the present patent application, these stoichiometric glasses are also referred to as "base glasses" or "constituent phases".

It is not a new concept to describe glasses in terms of the constituent phases to be assigned thereto. Specification of the base glasses makes it possible to draw conclusions as to the chemical structure of a glass (cf. Conradt R: "Chemical structure, medium range order, and crystalline reference state of multicomponent oxide liquids and glasses", in Journal of Non-Crystalline Solids, Volumes 345-346, 15 Oct. 2004, Pages 16-23, incorporated herein in its entity by reference).

Embodiments of the invention provides a glass having a combination of base glasses, which is characterized by the following phases constituting the glass:

TABLE 1

| Constituent phase | Min (mol %) | Max (mol %) |
| --- | --- | --- |
| Reedmergnerite | 10 | 80 |
| Albite | 1 | 40 |
| Potassium reedmergnerite | 0 | 60 |
| Danburite | 0 | 30 |
| Cordierite | 0 | 20 |
| Willemite | 0 | 20 |
| Silicon dioxide | 0 | 65 |
| Diboron trioxide | 0 | 20 |
| Pekovite | 0 | 20 |
| Maleevite | 0 | 25 |

In accordance with an embodiment of the invention, a glass is provided having a combination of base glasses, which is characterized by the following phases constituting the glass, wherein the sum of the proportions of reedmergnerite, potassium reedmergnerite and albite is at least 50 mol %:

TABLE 2

| Constituent phase | Min (mol %) | Max (mol %) |
| --- | --- | --- |
| Reedmergnerite | 20 | 50 |
| Albite | 15 | 40 |
| Potassium reedmergnerite | 0 | 20 |
| Danburite | 0 | 15 |
| Cordierite | 0 | 15 |
| Willemite | 0 | 15 |
| Silicon dioxide | 25 | 50 |
| Diboron trioxide | 1 | 10 |
| Pekovite | 0 | 10 |
| Maleevite | 0 | 10 |

In accordance with an embodiment of the invention, a glass is provided having a combination of base glasses, which is characterized by the following phases constituting the glass:

TABLE 3

| Constituent phase | Min (mol %) | Max (mol %) |
| --- | --- | --- |
| Reedmergnerite | 9 | 50 |
| Albite | 1 | 15 |
| Potassium reedmergnerite | 0 | 20 |
| Danburite | 0 | 30 |
| Cordierite | 0 | 20 |
| Willemite | 0 | 20 |
| Silicon dioxide | 25 | 65 |
| Diboron trioxide | 0 | 10 |
| Pekovite | 0 | 20 |
| Maleevite | 0 | 25 |

The composition is selected in terms of the phases constituting the glass within the limits described herein. The phases constituting the glass are of course not present in crystalline form but in amorphous form in the glass product. However, this does not mean that the constituent phases have completely different structural components in the amorphous state than in the crystalline state. As stated above, the topology of the structural components, i.e., for example, the coordination of the participating cations to surrounding oxygen atoms or the interatomic distance resulting from the coordination and strength of the bond between these cations and surrounding oxygen atoms, is comparable. For this reason, many properties of the glass of the invention can be described well in terms of the constituent phases, in particular in order to indicate the inventive achievement and the problems overcome by the invention (cf. Conradt R., loc. cit.). Here, the glass can naturally be produced not only using the corresponding crystals but also using conventional glass raw materials as long as the stoichiometric ratios permit the formation of the appropriate structural components of the base glasses.

The selection of the phases is done in view of their influence on the hydrolytic and alkali resistance and on the thermal expansion. In the following, calculation methods are described for calculating these three parameters from a predefined composition of constituent phases. These calculation methods are significant for both the selection of constituent phases and for the composition of a glass of the invention from these constituent phases.

Calculation of the pH-Value of the Aqueous Solution at the Test of the Hydrolytic Resistance The calculation of the pH-value in aqueous solution starts with the composition given in simple oxides. In the dilute solution of the glass components the respective cations are converted into the most oxidized hydroxides (see Table 4). The release of an H$^+$ or OH$^-$ by these hydroxides is described by a corresponding pKa- or pKb-value, respectively.

Herein the pH-value is the value obtained after dissolution of 50 μmol in one liter of the aqueous solution after cooling to room temperature (25° C.).

TABLE 4

| # | Oxide | Hydroxide | | |
|---|---|---|---|---|
| 1. | SiO$_2$ | H$_4$SiO$_4$ | H$_4$SiO$_4$ → H$_3$SiO$_4^-$ + H$^+$ | pKa = 9.7 [1] |
| | | | H$_3$SiO$_4^-$ → H$_2$SiO$_4^{-2}$ + H$^+$ | pKa = 11.9 [1] |
| 2. | B$_2$O$_3$ | H$_3$BO$_3$ | H$_3$BO$_3$ → H$_2$BO$_3^-$ + H$^+$ | pKa = 9.23 [2] |
| 3. | Al$_2$O$_3$ | H$_3$AlO$_3$ | H$_3$AlO$_3$ → H$_2$AlO$_3^-$ + H$^+$ | pKa = 12.3 [3] |
| | | | H$_2$AlO$_2^+$ + H$_2$O → H$_3$AlO$_3$ + H$^+$ | pKa = 5.7 [3] |
| 4. | ZnO | H$_2$ZnO$_2$ | Zn$^{+2}$ + H$_2$O → ZnOH$^+$ + H$^+$ | pKa = 9.05 [4] |
| | | | ZnOH$^+$ + H$_2$O → Zn(OH)$_2$ + H$^+$ | pKa = 9.75 [4] |
| | | | Zn(OH)$_2$ + H$_2$O → Zn(OH)$_3^-$ + H$^+$ | pKa = 10.1 [4] |
| | | | Zn(OH)$_3^-$ + H$_2$O → Zn(OH)$_4^-$ + H$^+$ | pKa = 10.05 [4] |
| 5. | MgO | Mg(OH)$_2$ | Mg(OH)$_2$ → Mg(OH)$^+$ + OH$^-$ | pKb = −2 [5] |
| | | | Mg(OH)$^+$ → Mg$^{++}$ + OH$^-$ | pKb = 2.58 [6] |
| 6. | CaO | Ca(OH)$_2$ | Ca(OH)$_2$ → Ca(OH)$^+$ + OH$^-$ | pKb = −2 [5] |
| | | | Ca(OH)$^+$ → Ca$^{++}$ + OH$^-$ | pKb = 1.3 [7] |
| 7. | SrO | Sr(OH)$_2$ | Sr(OH)$_2$ → Sr(OH)$^+$ + OH$^-$ | pKb = −2 [5] |
| | | | Sr(OH)$^+$ → Sr$^{++}$ + OH$^-$ | pKb = 0.82 [8] |
| 8. | BaO | Ba(OH)$_2$ | Ba(OH)$_2$ → Ba(OH)$^+$ + OH$^-$ | pKb = −2 [5] |
| | | | Ba(OH)$^+$ → Ba$^{++}$ + OH$^-$ | pKb = 0.62 [9] |
| 9. | Na$_2$O | NaOH | NaOH → Na$^+$ + OH$^-$ | pKb = −0.77 [10] |
| 10. | K$_2$O | KOH | KOH → K$^+$ + OH$^-$ | pKb = −2 [11] |

[1] Pure Appl. Chem., 1969, Vol. 20, No. 2, pp. 133-236, digit 176, incorporated herein in its entity by reference; value of the source indicated as „G40" therein.
[2] Pure Appl. Chem., 1969, Vol. 20, No. 2, pp. 133-236, digit 15, incorporated herein in its entity by reference; value of the source indicated as „M11" therein. According to the source indicated as „I4" therein, the second pKa-value of boric acid is higher than „14"; this dissociation does thus not have to be considered.
[3] David W. Hendricks, Water Treatment Unit Processes: Physical and Chemical, CRC Taylor and Francis, Boca Raton, London, New York, 2006, p. 307, incorporated herein in its entity by reference; values of the sources indicated as „4", „5", „11", „12" therein.
[4] Artur Krezel, Wolfgang Maret, The biological inorganic chemistry of zinc ions, Archives of Biochemistry and Biophysics (2016), p. 1-17, incorporated herein in its entity by reference.
[5] As in case of barium hydroxide (see Pure Appl. Chem., 1969, Vol. 20, No. 2, pp. 133-236, digit 12, incorporated herein in its entity by reference), it is assumed that M(OH)$_2$ → M(OH)$^+$ + OH$^-$ proceeds completely for all alkaline earth metals M; as pKb-value for this first dissociation the highest pKb-value occurring in this table is set, namely the pKb-value of potassium hydroxide solution.
[6] Pure Appl. Chem., 1969, Vol. 20, No. 2, pp. 133-236, digit 115, incorporated herein in its entity by reference; value of the source indicated as „S74" therein.
[7] Pure Appl. Chem., 1969, Vol. 20, No. 2, pp. 133-236, digit 18, incorporated herein in its entity by reference; value of the source indicated as „D9" therein.
[8] Pure Appl. Chem., 1969, Vol. 20, No. 2, pp. 133-236, digit 180, incorporated herein in its entity by reference; value of the source indicated as „G26" therein.
[9] Pure Appl. Chem., 1969, Vol. 20, No. 2, pp. 133-236, digit 12, incorporated herein in its entity by reference; value of the source indicated as „B31" therein.
[10] Pure Appl. Chem., 1969, Vol. 20, No. 2, pp. 133-236, digit 178, incorporated herein in its entity by reference; value of the source indicated as „G26" therein.
[11] Pure Appl. Chem., 1969, Vol. 20, No. 2, pp. 133-236, digit 164, incorporated herein in its entity by reference; value of the source indicated as „K2" therein.

At a given composition, the pH-value is calculated by solving the system of equations for the different concentrations [ . . . ] (for pKa and pKb the values listed above have to be inserted):

System of Equations

1. $[H_2SiO_4^{--}][H^+]/[H_3SiO_4^-]=10^{-pka}$,

2. $[H_2SiO_4^-][H^+]/[H_3SiO_4]=10^{-pka}$,

3. $[H_2SiO_4^{--}]+[H_3SiO_4^-]+[H_4SiO_4]=50$ μmol/l$*c_{SiO2}$,

4. $[H_2BO_3^-][H^+]/[H_3BO_3]=10^{-pka}$,

5. $[H2BO_3^-]+[H_3BO_3]=50$ μmol/l$*2*c_{B2O3}$,

6. $[H_4AlO_4^-][H^+]/[H_3AlO_3]=10^{-pka},[H_3AlO_3][H^+]/[H_2AlO_2^+]=10^{-pka}$, 7. $[H_4AlO_4^-]+[H_3AlO_3]+[H_2AlO_2^+]=50$ μmol/l$*2*c_{Al2O3}$, 8. $[ZnOH^+][H^+]/[Zn^{++}]=10^{-pka}$, 9. $[Zn(OH)_2][H^+]/[ZnOH^+]=10^{-pka}$, 10. $[Zn(OH)_3^-][H^+]/[Zn(OH)_2]=10^{-pka}$, 11. $[Zn(OH)_4^{--}][H^+]/[Zn(OH)_3^-]=10^{-pka}$, 12. $[ZnOH^+]+[Zn^{++}]+[Zn(OH)_2]+[Zn(OH)_3^-]+[Zn(OH)_4^{--}]=50$ μmol/l$*c_{ZnO}$, 13. $[MgOH^+][OH^-]/[Mg(OH)_2]=10^{-pkb},[Mg^{++}][OH^-]/[MgOH^+]=10^{-pkb}$, 14. $[MgOH^+]+[Mg(OH)_2]+[Mg^{++}]=50$ μmol/l$*c_{MgO}$, 15. $[CaOH^+][OH^-]/[Ca(OH)_2]=10^{-pkb},[Ca^{++}][OH^-]/[CaOH^+]=10^{-pkb}$, 16. $[CaOH^+]+[Ca(OH)_2]+[Ca^{++}]=50$ μmol/l$*c_{CaO}$, 17. $[SrOH^+][OH^-]/[Sr(OH)_2]=10^{-pkb},[Sr^{++}][OH^-]/[SrOH^+]=10^{-pkb}$, 18. $[SrOH^+]+[Sr(OH)_2]+[Sr^{++}]=50$ μmol/l$*c_{SrO}$, 19. $[BaOH^+][OH^-]/[Ba(OH)_2]=10^{-pkb},[Ba^{++}][OH^-]/[BaOH^+]=10^{-pkb}$, 20. $[BaOH^+]+[Ba(OH)_2]+[Ba^{++}]=50$ μmol/l$*c_{BaO}$, 21. $[Na^+][OH^-]/[NaOH]=10^{-pkb}$, 22. $[Na^+]+[NaOH]=50$ μmol/l$*2*c_{Na2O}$, 23. $[K^+][OH^-]/[KOH]=10^{-pkb}$, 24. $[K^+]+[KOH]=50\ \mu mol/l*2*c_{K2O}$,

25. $[OH^-][H^+]=10^{-14}$,

26. $2*[H_2SiO_4^{--}]+[H_3SiO_4^-]+[H_2BO_3^+]+[H_4AlO_4^-]+$
    $2*[Zn(OH)_4^{--}]+[Zn(OH)_3^-]+[OH^{--}]=$
    $[H_2AlO_2^+]+2*[Zn++]+[ZnOH+]+2*[Ba^{++}]+$
    $[BaOH^+]+2*[Ca^{++}]+[CaOH^+]+2*[Mg^{++}]+$
    $[MgOH^+]+[Na^+]+[K^+]+[H^+]$ (1)

The equations 1 to 25 are equilibrium conditions, and equation 26 is the electrical neutrality condition. In accordance with the common and widespread notation of concentrations, concentrations presented in square brackets ("[ . . . ]") indicate concentrations in "mol/l".

The system of equations is unambiguously solvable with one of the common mathematical codes as for example MATHEMATICA by Wolfram Research Inc. MATHEMATICA provides a list of solutions, of which only one fulfills the additional condition that all concentrations have to have positive values.

The pH value is by definition the negative decadic logarithm of [H+].

Calculation of the Alkali Resistance According to ISO 695

An embodiment of the invention is based at this point on the surprisingly found correlation between a factor constructed by means of topological considerations and the ablation rate measured with the test according to ISO 695.

The essence of topological considerations is to count the constraints imposed on atoms by the bonds to their neighboring atoms as for example described in detail in DE 10 2014 119 594 A1, incorporated herein in its entity by reference. These constraints relate to the interatomic distance ("distance condition") on the one hand and on the bond angles ("angular condition") on the other hand. If an atom has r neighbors (r=coordination number), r/2 distance conditions attributable to this atom result from the r distance conditions to these neighbors, if the distance conditions are distributed equally among the bonding partners. Further 2r-3 angular conditions attributable to this atom result from the bond angles between these neighbors with the considered atom at the tip of the respective angle.

A method is described in DE 10 2014 119 594 A1 that includes weighting all conditions by the single bond strength during calculation of the distance conditions and of the angular conditions and furthermore an additional weighting of the angular conditions (only of the angular conditions arising from the oxygen-cation-oxygen angles; the conditions belonging to the cation-oxygen-cation angles are disregarded) by the covalency of the respective bond. The weighting factors are normalized by dividing by the single bond strength or by the covalency of the silicon-oxygen bond, respectively, so that for quartz glass a number of (rounded) 1.333333333 distance conditions and (rounded) 1.666666667 angular conditions per atom results. As explained in DE 10 2014 119 594 A1, this corresponds to the direct analysis of the topology of quartz glass, if all distance conditions and angular conditions are simply counted and the angular conditions of the silicon-oxygen-silicon angle are disregarded.

Thus, quartz glass has a number of "3" constraints per atom, which is exactly the number of degrees of freedom per atom. Consequently, quartz glass should have no (or in reality: a very low) number of degrees of freedom per atom, which corresponds to the low $c_p$-jump of quartz glass at the glass transition measured by differential calorimetry (see R. Brüning, "On the glass transition in vitreous silica by differential thermal analysis measurements", Journal of Non-Crystalline Solids 330 (2003) 13-22, incorporated herein in its entity by reference).

In general, for other oxidic glasses lower values result for the numbers of distance conditions and angular conditions per atom than (rounded) 1.333333333 or 1.666666667. The differences are accordingly the numbers of the distance-related degrees of freedom or angular degrees of freedom per atom. With regard to the angular degrees of freedom it can be further differentiated, whether the corresponding angular conditions relate to angles that are all within one plane (trigonal coordination) or not (tetrahedral or higher coordination). The latter are here being termed 3D angle conditions; the difference to (rounded) 1.666666667 is accordingly being termed 3D angular degrees of freedom.

Surprisingly, a correlation is found between the number of 3D angular degrees of freedom per atom and the ablation rate r at the ISO 695 test. This correlation tested with a plurality of borosilicate glasses is given by:

$$r=c\cdot(6.8+(1+f)^B),\quad (2)$$

"c" is a constant having the dimension mg/(dm²3 h); the numerical value is 7.57. "f" is the number of 3D angular degrees of freedom per atom. The exponent "8" has been found empirically. The constant term "6.8" serves for correction of the idealized assumptions on quartz glass so that also quartz glass is described by (2).

Since the glasses of the invention have a combination of the constituent phases indicated above, it is appropriate for calculating the number of 3D angular degrees of freedom per atom that these are initially indicated numerically for each constituent phase. The following applies here:

TABLE 5

| Constituent phase | Formel (normalized to a simple oxide) | Atoms per structural unit | Number of 3D angular degrees of freedom per atom |
|---|---|---|---|
| Reedmergnerite | $(Na_2O\bullet B_2O_3\bullet 6SiO_2)/8$ | 26/8 | 0.235470229 |
| Albite | $(Na_2O\bullet Al_2O_3\bullet 6SiO_2)/8$ | 26/8 | 0.318898019 |
| Potassium reedmergnerite | $(K_2O\bullet B_2O_3\bullet 6SiO_2)/8$ | 26/8 | 0.238787725 |
| Danburite | $(CaO\bullet B_2O_3\bullet 2SiO_2)/4$ | 13/4 | 0.325810349 |
| Cordierite | $(2MgO\bullet 2Al_2O_3\bullet 5SiO_2)/9$ | 29/9 | 0.427525473 |
| Willemite | $(2ZnO\bullet SiO_2)/3$ | 7/3 | 0.725827911 |
| Silicon dioxide | $SiO_2$ | 3 | 0 |
| Diboron trioxide | $B_2O_3$ | 5 | 1.666666667 |
| Pekovite | $(SrO\bullet B_2O_3\bullet 2SiO_2)/4$ | 13/4 | 0.334391592 |
| Maleevite | $(BaO\bullet B_2O_3\bullet 2SiO_2)/4$ | 13/4 | 0.33848284 |

The numerical values have been calculated by the method described in DE 10 2014 119 594 A1, wherein here the number of angular degrees of freedom has been calculated for all cations as described in DE 10 2014 119 594 A1 for boron and aluminum only; furthermore, the degree of ionization has not been calculated according to formula (8) of DE 10 2014 119 594 A1 but instead by formula (3) of Alberto Garcia, Marvon Cohen, First Principles Ionicity Scales, Phys. Rev. B 1993, incorporated herein in its entity by reference. The necessary coordination numbers have been taken from the mineralogical literature listed below at the discussion of the constituent phases; based on Conradt R., loc. cit. we assume that the coordination numbers of the cations in the glass are the same as in the corresponding crystal phases.

The calculation method for determining the 3D angular degrees angular freedom f per atom in the finished glass is therefore:

$$f = \frac{\sum_{i=2}^{n} c_i \cdot z_i \cdot f_i}{\sum_{i=3}^{n} c_i \cdot z_i}, \tag{3}$$

wherein $c_i$ is the mole fraction of the i-th constituent phase in the glass composition concerned, $z_i$ is the number of atoms per structural unit in the i-th constituent phase and fi is the number of angular degrees of freedom per atom in the i-th constituent phase. "n" is the number of constituent phases.

For the glasses of this invention it applies in particular that the number of angular degrees of freedom per atom in the bulk is up to 0.339, up to 0.328, or up to 0.304, preferably less than 0.29, particularly preferably less than 0.28, more preferably up to 0.276, more preferably less than 0.26, more preferably less than 0.25, more preferably up to 0.244, more preferably less than 0.23, more preferably less than 0.22, more preferably less than 0.21, more preferably up to 0.204, more preferably less than 0.19, more preferably less than 0.18, more preferably less than 0.17, more preferably less than 0.16, more preferably up to 0.152. If it is ensured that the number of angular degrees of freedom per atom does not exceed this value, the fragility remains in a desired range. In particular, this value is advantageous in order to make it possible to produce ultra-thin glass articles, too. In particular, the number of angular degrees of freedom per atom is at least 0.1.

Coefficient of Thermal Expansion

Surprisingly, also the position of the coefficient of thermal expansion in the desired range can be represented by means of a very simple calculation method. This is determined with reference to the average bond strength.

It is known from the literature that the coefficient of thermal expansion, for example for metals, is inversely proportional to the binding energy (or to the "depth of the interatomic potential wells"), see for example H. Föll, lecture notes of the lecture "Einführung in die Materialwissenschaft I", Christian Albrechts University Kiel, pp. 79-83, incorporated herein in its entity by reference.

In a simple picture of oxidic glasses, the cations are in each case placed in a potential well formed by the surrounding oxygen atoms, and the depth of the potential well is considered to be the sum of the bond strengths of the various single bonds to the surrounding oxygen atoms, i.e. the total interaction energy is concentrated in potential wells with the cations in the centre and the oxygen atoms in the periphery. Thus, the reverse case no longer has to be considered; it would also be more difficult to analyse since an oxygen atom can be located between a number of different cations, which conversely cannot occur in purely oxidic glasses. These values have been tabulated, e.g. in DE 10 2014 119 594 A1:

TABLE 6

| Cation | Potential well depth/(kJ/mol) |
|---|---|
| Si | 1864 |
| B | 1572.5 |
| Al | 1537 |
| Zn | 728 |
| Mg | 999 |
| Ca | 1063 |
| Sr | 1005 |
| Ba | 976 |
| Na | 440.5 |
| K | 395 |

The values for Sr, Ba and Zn do not originate from DE 10 2014 119 594 A1, but have been calculated by precisely the same method described there using the sources cited there.

An average potential well depth can be calculated from the composition of a glass composed of the abovementioned constituent phases, the numbers of various cations present in the respective phases and the potential well depths per cation tabulated above:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \tag{4}$$

Here, m is the number of cation types present, $E_{pot,j}$ is the potential well depth tabulated above for the j-th cation type and $z_{j,i}$ is the number of cations of the j-th type in the i-th constituent phase. The sums over j are tabulated below:

TABLE 7

| constituent phase | $\sum_{j=1}^{m} z_{i,j}$ | $\Sigma_{j=1}^{m} z_{i,j} \cdot E_{pot,j}/$ (kJ/mol) |
|---|---|---|
| Reedmergnerite | 1.25 | 1901.25 |
| Albite | 1.25 | 1892.38 |
| Potassium reedmergnerite | 1.25 | 1889.88 |
| Danburite | 1.25 | 1984 |
| Cordierite | 1.22 | 1940.67 |
| Willemite | 1.00 | 1106.67 |
| Silicon dioxide | 1.00 | 1864.00 |
| Diboron trioxide | 2.00 | 3145.00 |
| Pekovite | 1.25 | 1969.5 |
| Maleevite | 1.25 | 1962.5 |

This average bond strength is inversely proportional to the thermal expansion coefficient, as for example also for metals (see H. Föll, loc. cit.). Analysis of a plurality of different glasses, among them commercial glasses as for example Borofloat33, Borofloat40, AF45, AF32 leads to the following formula:

$$CTE = \left( \frac{51815\left(\frac{kJ}{Mol}\right)}{E_{pot}} - 27.205 \right) ppm/K, \tag{5}$$

As the bond strength is inversely proportional to the melting point, an inversely proportional correlation also exists between melting point and expansion coefficient (see again H. Föll, loc. cit.). As the melting point is not exactly defined for non-stoichiometric glasses, there is only a correlation by tendency between the temperature, at which the viscosity is 100 dPas, generally referred to as melting point, and the expansion coefficient. However, it is ensured by this correlation that the glasses of the invention are meltable.

While the requirement of a good meltability suggests a thermal expansion coefficient as high as possible, the requirement of as low as possible thermal tensions during potential thermal post-processing conversely suggests a thermal expansion coefficient as low as possible. The combination of both requirements results in the preferred medium range for the expansion coefficient or the average potential well depth, respectively.

The glasses according to embodiments of this invention preferably have average potential well depths of 1515 kJ/mol to 1715 k//mol, more preferably 1538 kJ/mol to 1660 kJ/mol, more preferably 1561 kJ/mol to 1660 kJ/mol and particularly preferably 1584 kJ/mol to 1634 kJ/mol.

Selection of Suitable Constituent Phases

Reedmergnerite

Reedmergnerite (American Mineralogist, Volume 50, pages 1827-1850, 1965, incorporated herein in its entity by reference) is selected as first phase with respect to the alkali and hydrolytic resistance. Reedmergnerite has a low number of 3D angular degrees of freedom per atom which is advantageous for the alkali resistance. It contains 75 mol % $SiO_2$ and 12.5 mol % $Na_2O$ which in water results in a buffer solution as described above. The pH value thereof is decreased by the additional 12.5 mol % $B_2O_3$ (in relation to the additional $SiO_2$). In accordance with an embodiment of the invention, one mol reedmergnerite is to be understood as one mol $(Na_2O.B_2O_3.6SiO_2)/8$.

The proportion of reedmergnerite in the glass according to embodiments of the invention is 10 to 80 mol %. The proportion of reedmergnerite should not be below the minimum amount because otherwise the high alkali resistance and hydrolytic resistance of the invention is not achieved.

According to a first embodiment, the proportion of reedmergnerite is even at least 15 mol %, at least 16 mol % or at least 20 mol %, in particular at least 24 mol %, at least 26 mol %, at least 28 mol % or at least 30 mol %. In order to counteract the tendency to segregation, the proportion of reedmergnerite is preferably limited to at most 70 mol %, preferably at most 60 mol %, more preferably at most 50 mol % or particularly preferably at most 45 mol % or at most 40 mol %. In an embodiment, the proportion of this component is limited to at most 35 mol %. Thus, preferred proportion ranges of the component reedmergnerite are: 24 mol % to 70 mol %, 26 mol % to 60 mol % and 28 mol % to 40 mol %.

According to a second embodiment, the proportion of reedmergnerite is at least 11 mol %, at least 12 mol %, in particular at least 13 mol %, at least 15 mol %, at least 18 mol % or at least 20 mol %. In order to counteract the tendency to segregation, the proportion of reedmergnerite is preferably limited to at most 40 mol %, preferably at most 36 mol %, more preferably at most 35 mol % or particularly preferably at most 30 mol % or at most 29 mol %. In an embodiment, the proportion of this component is limited to at most 22 mol %. Thus, preferred proportion ranges of the component reedmergnerite are: 11 mol % to 40 mol %, 12 mol % to 36 mol % and 13 mol % to 35 mol % and 11 to 22 mol %.

Albite

For suppressing a potential tendency to segregation of a pure borosilicate system the aluminum-analogue of reedmergnerite, the albite, is added as second phase (American Mineralogist, Volume 81, pages 1344-1349, 1996, incorporated herein in its entity by reference), see with respect to segregation J. W. Greig, Immiscibility in silicate melts, Am. J. Sci., 5th ser., Vol. 13 (1927), 1-44 and 133-154, incorporated herein in its entity by reference. In accordance with an embodiment of the invention, one mol albite is to be understood as one mol $(Na_2O.Al_2O_3.6SiO_2)/8$. Furthermore, a certain proportion of albite increases the chemical toughenability of the glasses.

The proportion of albite in the glass of the invention is 1 to 40 mol %. The amount of albite should not be below the minimum amount, because otherwise a too high tendency to segregation has to be feared.

According to a first embodiment, the proportion of albite is even at least 4 mol % or at least 10 mol %, in particular at least 15 mol %, at least 20 mol %, at least 23 mol % or at least 25 mol %. In order not to risk a deterioration of the hydrolytic resistance, the proportion of albite is preferably limited to at most 35 mol %, preferably at most 32 mol %, more preferably at most 30 mol % or particularly preferably at most 29 mol %. Thus, preferred proportion ranges of the component albite are: 15 mol % to 35 mol %, 20 mol % to 32 mol % and 23 mol % to 30 mol %.

In a second embodiment, the proportion of albite is at least 1 mol %, at least 2 mol % or at least 3 mol %. In order not to risk a deterioration of the hydrolytic resistance, the proportion of albite is preferably limited to at most 10 mol %, preferably at most 9 mol %, more preferably at most 8 mol % or particularly preferably at most 6 mol %. Thus, preferred proportion ranges of the component albite are: 1 mol % to 10 mol %, 2 mol % to 9 mol % and 3 mol % to 8 mol %.

Potassium Reedmergnerite

Likewise for suppressing a potential tendency to segregation the potassium-analogue of reedmergnerite is added as third phase (Mineralogical Magazine 57 (1993) 157-164, incorporated herein in its entity by reference). One mol potassium reedmergnerite is to be understood as one mol $(K_2O.B_2O_3.6SiO_2)/8$.

The proportion of potassium reedmergnerite in the glass according to an embodiment of the invention is 0 to 60 mol % or 0 to 40 mol %. A certain proportion of potassium reedmergnerite may be useful for suppressing a too high tendency to segregation.

In embodiments, the proportion of potassium reedmergnerite is even at least 1 mol %, at least 3 mol % or at least 5 mol %. In order not to risk a deterioration of the hydrolytic resistance, the proportion of potassium reedmergnerite is preferably limited to at most 40 mol %, preferably at most 30 mol %, more preferably at most 20 mol % or particularly preferably at most 10 mol %. Thus, preferred proportion ranges of the component potassium reedmergnerite are: 0 mol % to 30 mol %, 0 mol % to 20 mol % and 0 mol % to 10 mol %. In an embodiment, the glass is free of potassium reedmergnerite.

In a first embodiment, the sum of the proportions of reedmergnerite, potassium reedmergnerite and albite is at least 52 mol %, at least 54 mol %, at least 55 mol % or at least 56 mol %. This sum is preferably limited to at most 70 mol %, at most 65 mol % or at most 60 mol %. It turned out that this composition feature useful for balancing hydrolytic and alkali resistance and tendency to segregation. The same holds true for the sum of the proportions of reedmergnerite and albite which are preferably at least 52 mol %, at least 54 mol %, at least 55 mol % or at least 56 mol %. This sum is preferably limited to at most 70 mol %, at most 65 mol % or at most 60 mol %. In an embodiment, the proportion of reedmergnerite is larger than the proportion of potassium reedmergnerite, in particular by a factor of at least 2, 3, 4, 5 or 6. In particular, it is valid with respect to the ratio of the proportions of reedmergnerite:albite that it is in a range of from 0.5:1 to 1.5:1, in particular in a range of from 0.8:1 to 1.4:1, in a range of from 0.9:1 to 1.3:1 or in a range of from >1:1 to 1.2:1. It is preferred that the proportion of reedmergnerite is larger than the proportion of albite, in particular by a relative proportion of 5%.

In a second embodiment, the sum of the proportions of reedmergnerite, potassium reedmergnerite and albite is at least at least 10 mol %, at least 15 mol %, at least 20 mol % or at least 25 mol %. This sum is preferably limited to at most 45 mol %, at most 40 mol % or at most 35 mol %. It turned out that this composition feature is useful for balancing hydrolytic and alkali resistance and tendency to segregation. The same holds true for the sum of the proportions of reedmergnerite and albite which are preferably at least 10 mol %, at least 14 mol %, at least 19 mol % or at least 24 mol %. This sum is preferably limited to at most 44 mol %, at most 39 mol % or at most 34 mol %. In an embodiment, the proportion of reedmergnerite is larger than the proportion of potassium reedmergnerite, in particular by a factor of at least 2, 3, 4, 5 or 6. In particular, it is valid with respect to the ratio of the proportions of reedmergnerite:albite that it is in a range of from 4:1 to 11:1, in particular in a range of from 5:1 to 10:1, in a range of from 5.5:1 to 9:1 or in a range of from 6:1 to 8:1.

Danburite, Cordierite, Pekovite, Maleevite, $SiO_2$, $B_2O_3$

All three constituent phases described so far contain alkali metals. Depending on the amount of alkali metals, glasses containing alkali metals have larger expansion coefficients (for example 8 to 10 ppm/K) than preferred. As a balancing measure, phases are added whose contribution either strongly reduces the expansion coefficient ($SiO_2$, $B_2O_3$) or shifts it to medium values (borosilicates or aluminosilicates of alkaline earth metals: danburite, cordierite, pekovite, maleevite; willemite (see American Mineralogist, Volume 59, pages 79-85, 1974, American Mineralogist, Volume 77, pages 407-411, 1992, The Canadian Mineralogist Vol. 42, pp. 107-119, 2004, incorporated herein in its entity by reference).

These further phases behave differently with respect to alkali and hydrolytic resistance so that a mixture is desirable. Danburite, pekovite and maleevite result in a minor decrease of alkali resistance relative to reedmergnerite. Cordierite and willemite result in a stronger decrease of alkali resistance. Silicon oxide results in a drastic increase of alkali resistance, boron oxide (in the glass assumed to be trigonally coordinated, see J. E. Shelby, Introduction into Glass Science and Technology, Royal Society of Chemistry, Cambridge, UK, 2005, S. 93, incorporated herein in its entity by reference) to a drastic decrease of alkali resistance. In return, boron oxide results in a decrease of pH in the aqueous solution at the test of hydrolytic resistance.

One mol danburite is to be understood as one mol $(CaO.B_2O_3.2SiO_2)/4$. The proportion of danburite in the glasses according to embodiments of the invention is based on above considerations at most 30 mol % or at most 20 mol %, preferably at most 18 mol %, at most 15 mol % or at most 12 mol %. However, for influencing the thermal expansion coefficient in accordance with the invention, a proportion of at least 1 mol %, at least 3 mol %, in particular at least 5 mol % or at least 7 mol % has proven its worth.

One mol cordierite is to be understood as one mol $(2MgO.2Al_2O_3\text{-}5SiO_2)/9$. The proportion of cordierite in the glasses according to embodiments of the invention is based on above considerations at most 20 mol %, preferably at most 10 mol %, at most 5 mol % or at most 3 mol %. In an embodiment the glass is free of cordierite, in another embodiment the glass contains cordierite in an amount of more than 0.1 mol %.

One mol willemite is to be understood as one mol $(2ZnO.SiO_2)/3$. The proportion of willemite in the glasses according to embodiments of the invention is based on above considerations at most 20 mol %, preferably at most 10 mol %, at most 5 mol % or at most 3 mol %. In an embodiment the glass is free of willemite, in another embodiment the glass contains willemite in a proportion of at least 0.1 mol % or at least 1 mol %.

One mol pekovite is to be understood as one mol $(SrO.B_2O_3.2SiO_2)/4$. The proportion of pekovite in the glasses according to embodiments of the invention is based on above considerations at most 20 mol %, preferably at most 10 mol %, at most 8 mol % or at most 7 mol %. In an embodiment the glass is free of pekovite, in another embodiment the glass contains pekovite in a proportion of at least 0.5 mol %, at least 1 mol % or at least 3 mol %.

One mol maleevite is to be understood as one mol $(BaO.B_2O_3.2SiO_2)/4$. The proportion of maleevite in the glasses according to embodiments of the invention is based on above considerations at most 25 Mol %, preferably at most 20 mol %, at most 15 mol % or at most 10 mol %. In an embodiment the glass is free of maleevite, in another embodiment the glass contains maleevite in an amount of at least 1 mol %, at least 3 mol % or at least 5 mol %. In a particular embodiment the proportion of maleevite is at least 12 mol % or at least 15 mol %.

In addition to the mentioned constituent phases the glass may additionally also comprise $SiO_2$ (silicon dioxide) and/or $B_2O_3$ (Diboron trioxide).

In accordance with an embodiment of the invention the proportion of $SiO_2$ is 0 to 65 mol %. In embodiments this proportion is at least 1 mol %, in particular at least 5 mol %, at least 10 mol %, at least 15 mol %, at least 25 mol % or >30 mol %. A too large proportion of $SiO_2$ increases the processing temperatures and suppresses the desired properties of the important constituent phases reedmergnerite and albite. Therefore, in an embodiment the content of this component is preferably limited to at most 60 mol %, at most 50 mol %, at most 40 mol %, at most 37 mol % or at most 34 mol %. In an alternative embodiment the proportion of $SiO_2$ is at least 40 mol % or at least 50 mol %.

In accordance with an embodiment of the invention, the proportion of $B_2O_3$ is 0 to 20 mol %. In embodiments this proportion is at least 0.1 mol %, in particular at least 0.5 mol %, at least 1 mol %, at least 2 mol % or at least 3 mol %. The content of this component is preferably limited to at most 18 mol %, at most 15 mol %, at most 10 mol %, at most 7 mol % or at most 5 mol %. The content of $B_2O_3$ is preferably lower than the content of $SiO_2$. In particular, the content of $SiO_2$ exceeds the content of $B_2O_3$ by a factor of at least 2, 3, 4, 5, 6 or 7. There is another reason for introducing diboron trioxide as constituent phase into the glass. This shifts the boron/sodium ratio to higher values which reduces the sodium and boron evaporation during melting and hot forming (see in C. Pentzel, D. Höhne, Chemische Aspekte bei Verdampfungsvorgängen aus Borosilicatglasschmelzen, Part III, Sprechsaal 124 (1991), 327-329, incorporated herein in its entity by reference).

Further Components

In addition to the abovementioned components, the glass can contain further constituents which are referred to as "balance" herein. The proportion of the balance in the glass of the invention is preferably not more than 5 mol %, in order not to disturb the glass properties set by careful selection of suitable base glasses. In particularly embodiments, the proportion of the balance in the glass is not more than 3 mol %, more preferably not more than 2 mol % or not more than 1 mol % or not more than 0.5 mol %. The balance contains, in particular, oxides which are not present in the base glasses mentioned here. Thus, the balance does not in particular contain any $SiO_2$, $B_2O_3$, $Al_2O_3$, ZnO, MgO, CaO, SrO, BaO, $Na_2O$ or $K_2O$. According to embodiments of the invention, as balance, use is optionally made of additions of further simple oxides of "intermediates", i.e. oxides which are between the network formers such as $SiO_2$ and the network modifiers such as $Na_2O$ (see Journal of The American Ceramic Society Vol. 30, No. 9 (1947), pp. 277-281, incorporated herein in its entity by reference). Although these oxides alone do not form any glasses, they can be incorporated in the abovementioned percentage range into the network. Thus, the balance can contain, in particular, oxides such as TiO2 and/or ZrO2. According to the theory of A. Dietzel, Die Kationenfeldstärken und ihre Beziehungen zu Entglasungsvorgängen, zur Verbindungsbildung und zu den Schmelzpunkten von Silicaten, Berichte der Bunsengesellschaft für physikalische Chemie Vol. 48 No 0.1 (1942), 9-23, Nb2O5 and Ta2O5 also count as "intermediates", as can be calculated using the ionic radii according to R. Shannon, Revised Effective Ionic Radii and Systematic Studies of Interatomic Distances in Halides and Chalcogenides, Acta Cryst. (1976) A32, 751-767, incorporated herein in its entity by reference.

When it is said in the present description that the glasses are free of a component or of a constituent phase or do not contain a certain component or constituent phase, this is intended to mean that this component or constituent phase may be present at most as impurity in the glasses. This means that it is not added in significant amounts. Amounts which are not significant are, according to embodiments of the invention, amounts of less than 300 ppm (molar), preferably less than 100 ppm (molar), particularly preferably less than 50 ppm (molar) and most preferably less than 10 ppm (molar). The glasses of the present invention are in particular free of lithium, lead, arsenic, antimony, bismuth and/or cadmium.

Preferred Glass Compositions

In an embodiment, the glass of the invention is characterized by the following preferred and particularly preferred proportions of constituent phases in the base glass composition. The preferred ranges of proportions indicated above and below and further features in respect of the glass of the invention also apply to the preferred and particularly preferred proportions outlined below:

TABLE 8

| Constituent phase | Preferred | | More preferred | |
|---|---|---|---|---|
| | Min (mol %) | Max (mol %) | Min (mol %) | Max (mol %) |
| Reedmergnerite | 24 | 70 | 26 | 60 |
| Albite | 15 | 35 | 20 | 32 |

TABLE 8-continued

| Constituent phase | Preferred | | More preferred | |
|---|---|---|---|---|
| | Min (mol %) | Max (mol %) | Min (mol %) | Max (mol %) |
| Potassium reedmergnerite | 0 | 30 | 0 | 20 |
| Danburite | 3 | 14 | 3 | 10 |
| Cordierite | 0 | 10 | 0 | 5 |
| Willemite | 0 | 10 | 0 | 5 |
| Silicon dioxide | 1 | 50 | 5 | 40 |
| Diboron trioxide | 0.1 | 18 | 0.5 | 15 |
| Pekovite | 0 | 10 | 0 | 5 |
| Maleevite | 0 | 10 | 0 | 5 |
| Optional balance | 0 | 5 | 0 | 5 |

In an embodiment, the glass of the invention is characterized by the following preferred and particularly preferred proportions of constituent phases in the base glass composition. The preferred ranges of proportions indicated above and below and further features in respect of the glass of the invention also apply to the preferred and particularly preferred proportions outlined below:

TABLE 9

| Constituent phase | Preferred | | More preferred | |
|---|---|---|---|---|
| | Min (mol %) | Max (mol %) | Min (mol %) | Max (mol %) |
| Reedmergnerite | 12 | 36 | 13 | 30 |
| Albite | 2 | 9 | 3 | 8 |
| Potassium reedmergnerite | 0 | 20 | 0 | 10 |
| Danburite | 1 | 20 | 2 | 18 |
| Cordierite | 0 | 10 | 0 | 5 |
| Willemite | 0 | 10 | 0 | 5 |
| Silicon dioxide | 40 | 65 | 50 | 60 |
| Diboron trioxide | 0 | 18 | 0 | 15 |
| Pekovite | 0 | 20 | 0.5 | 10 |
| Maleevite | 0 | 25 | 3 | 25 |
| Optional balance | 0 | 5 | 0 | 5 |

Surface Properties

The glasses of the present invention preferably have a relatively small property gradient between the bulk glass and the surface of a glass article produced from the glass. A glass article made of the glass described herein is likewise part of an embodiment of the present invention.

For the purposes of the invention, a "surface" is a proportion of the glass which is close to the glass/air interface. The glass forming the surface will here be referred to as "surface glass"; the remaining glass located further in the interior will here be referred to as "bulk glass". A precise demarcation between surface and bulk is difficult; therefore, it is specified for the purposes of the present invention that the surface glass is present in a depth of about 6 nm. The properties of the surface glass are consequently determined at a depth of about 6 nm. The properties of the bulk glass are determined by calculation since the glass composition at a greater depth does not experience any change as a result of production. Bulk glass is in any case present at a depth of 500 nm. The surface can be advantageously influenced by particular measures during glass production. The composition of the surface glass at a depth of about 6 nm can be measured by means of Cs-TOF-SIMS at 1000 eV.

It is known that evaporation of alkali metals and boron may occur during melting and hot forming of alkali metal containing borosilicate glasses. In presence of boron, alkali metals and boron preferably evaporate together as metaborates. This is the mechanism of evaporation of alkali metal and boron atoms that are present in the constituent phases of reedmergnerite, potassium reedmergnerite and albite. Trigonal boron, thus boron that has not proceeded to the tetragonal coordination by binding a further oxygen atom, for example originating from an alkali metal oxide, is geometrically and energetically tightly bound which is counteracting the evaporation tendency, however, it may evaporate as metaboric acid which is formed together with water vapor from the surrounding atmosphere. This is the mechanism of evaporation of boron atoms which are present in the distinct constituent phase $B_2O_3$. All mechanisms of evaporation are subject to a strong temperature dependency.

The loss of particular glass components at the surface of the glass is thus dependent not only on the glass composition but also on the production process. In particular, the loss of free $B_2O_3$ can be set by setting the partial pressure of water vapour and the temperature during moulding of a glass article. More diboron trioxide vaporizes in the form of metaboric acid at a higher partial pressure of water vapour.

A process is known from DE 10 2014 101 756 B4 which includes an increase of the hydrolytic resistance by applying water vapor. The investigated glasses typically have a significant proportion of diboron trioxide as constituent phase so that it is to be assumed that the observed increase of the hydrolytic resistance by applying water vapor is attributable to the conversion of diboron trioxide into boric acid and the evaporation thereof.

However, the temperature control in the hot forming region and the applying of water vapor should not lead to the composition of the surface being changed too strongly as compared to the interior of the glass because this results in an undesired difference between the expansion coefficient at the surface and in the bulk glass. The latter may cause undesired tensions.

Boron is defined as leading element for the compositional change at the surface. Thus, a limit is defined by the content of boron in the surface glass, as measured by Cs-ToF-SIMS at 1000 eV, being at least 50%, preferably at least 60%, particularly preferably at least 80% of the content of boron intended for carrying out the invention and also being present in the bulk glass. In order to keep the loss of boron within the desired limits, a gas having a lower water vapor content may be applied if appropriate, thus deviating from the gas of DE 10 2014 101 756 B4 that is saturated with water vapor at 90° C. A certain loss of boron increases the hydrolytic resistance, a too high loss of boron and thus high difference between the content of boron in the surface glass and in the bulk glass leads to tensions. Preferably, the content of boron in the surface glass is reduced in relation to the bulk glass by at least 0.1 mol %, in particular at least 0.5 mol %, or at least 1 mol %, in particular at least 2 mol % or at least 5 mol %. The values can, in particular, be measured immediately after production of the glass.

Production

An embodiment of the invention also provides a process for producing a glass, comprising the steps:
melting of the glass raw materials,
optionally forming a glass article, in particular a glass tube, from the glass melt,
cooling of the glass.

The forming of the glass may comprise a drawing process, in particular a tube draw process. Cooling can be carried out by active cooling using a coolant, e.g. a cooling fluid, or by allowing the glass to cool passively.

During the melting and/or the forming the surrounding atmosphere, in particular the degree of saturation with water vapor thereof, may be adjusted. In particular, the step of melting and/or forming comprises the step of applying a water vapor containing gas to the glass. By adjusting the saturation of the atmosphere with water vapor the loss of diboron trioxide can be adjusted to the values of the invention. Preferred are values of less than 100% relative humidity at 90° C., in particular less than 80% relative humidity at 90° C., preferably less than 70% relative humidity at 90° C. and particularly preferably less than 60% relative humidity at 90° C. By suitably choosing relative humidity and temperature the skilled person can adjust the boron oxide content in the surface glass described as desired above. The atmosphere may for example be blown into the process area in form of a cooling gas during forming, in particular into the cavity of a drawn glass tube.

Uses and Glass Articles

In accordance with embodiments of the invention are in addition to the glass also glass articles formed from the glass as for example glass tubes and containers (like flasks, vials, carpules, syringes). Preferably, the glass articles are intended for use as packaging for pharmaceutical products, in particular as containers for liquids. In the context of these uses the hydrolytic and alkali resistance are of particular interest.

EXAMPLES

Conversion of the Composition from Constituent Phases into Composition of Simple Oxides and Vice Versa As there are, in addition to properties that can well be described based on the composition in constituent phases, also such properties for which the conventional description and calculation has to be done based on the composition in simple oxides, we at first provide a conversion matrix for mutual conversion of both compositional representations.

The composition in constituent phases is indicated in the following normalized form for the purpose of conversion:

TABLE 10

| Constituent phase | Formula (normalized to a simple oxide) |
|---|---|
| Reedmergnerite | $(Na_2O \cdot B_2O_3 \cdot 6SiO_2)/8$ |
| Albite | $(Na_2O \cdot Al_2O_3 \cdot 6SiO_2)/8$ |
| Potassium reedmergnerite | $(K_2O \cdot B_2O_3 \cdot 6SiO_2)/8$ |
| Danburite | $(CaO \cdot B_2O_3 \cdot 2SiO_2)/4$ |
| Cordierite | $(2MgO2Al_2O_3 \cdot 5SiO_2)/9$ |
| Willemite | $(2ZnO \cdot SiO_2)/3$ |
| Silicon dioxide | $SiO_2$ |
| Diboron trioxide | $B_2O_3$ |
| Pekovite | $(SrO \cdot B_2O_3 \cdot 2SiO_2)/4$ |
| Maleevite | $(BaO \cdot B_2O_3 \cdot 2SiO_2)/4$ |

The conversion of these compositions into a composition in mol % of the following simple oxides

| # | Oxide |
|---|---|
| 1. | $SiO_2$ |
| 2. | $B_2O_3$ |
| 3. | $Al_2O_3$ |
| 4. | ZnO |
| 5. | MgO |
| 6. | CaO |
| 7. | SrO |
| 8. | BaO |
| 9. | $Na_2O$ |
| 10. | $K_2O$ | is carried out with the aid of the matrix indicated here. Here, the composition in mol % of the base glasses is multiplied as column vector from the right onto the matrix:

Matrix

| 6/8 | 6/8 | 6/8 | 2/4 | 5/9 | 1/3 | 1 | 0 | 2/4 | 2/4 |
|---|---|---|---|---|---|---|---|---|---|
| 1/8 | 0 | 1/8 | 1/4 | 0 | 0 | 0 | 1 | 1/4 | 1/4 |
| 0 | 1/8 | 0 | 0 | 2/9 | 0 | 0 | 0 | 0 | 0 |
| 0 | 0 | 0 | 0 | 0 | 2/3 | 0 | 0 | 0 | 0 |
| 0 | 0 | 0 | 0 | 2/9 | 0 | 0 | 0 | 0 | 0 |
| 0 | 0 | 0 | 1/4 | 0 | 0 | 0 | 0 | 0 | 0 |
| 0 | 0 | 0 | 0 | 0 | 0 | 0 | 0 | 1/4 | 0 |
| 0 | 0 | 0 | 0 | 0 | 0 | 0 | 0 | 0 | 1/4 |
| 1/8 | 1/8 | 0 | 0 | 0 | 0 | 0 | 0 | 0 | 0 |
| 0 | 0 | 1/8 | 0 | 0 | 0 | 0 | 0 | 0 | 0 |

×

| $(Na_2O \cdot B_2O_3 \cdot 6SiO_2)/8$ |
|---|
| $(Na_2O \cdot Al_2O_3 \cdot 6SiO_2)/8$ |
| $(K_2O \cdot B_2O_3 \cdot 6SiO_2)/8$ |
| $(CaO \cdot B_2O_3 \cdot 2SiO_2)/4$ |
| $(2MgO \cdot 2Al_2O_3 \cdot 5SiO_2)/9$ |
| $(2ZnO \cdot SiO_2)/3$ |
| $SiO_2$ |
| $B_2O_3$ |
| $(SrO \cdot B_2O_3 \cdot 2SiO_2)/4$ |
| $(BaO \cdot B_2O_3 \cdot 2SiO_2)/4$ |

The result of the multiplication of the column vector onto the matrix gives the composition of the glass in mol %.

Conversely, a composition in mol % can be converted simply into a base glass composition via the respective inverse matrix. Here, naturally only those base glass compositions which on conversion do not give any negative values for the base glasses are in accordance with the invention.

Example 1

The first example is a glass that contains a high proportion of diboron trioxide (8%) in view of ablation of boron and boron compounds in the hot forming region being as low as possible. It has the composition:

TABLE 11

| Constituent phase | Proportion/mol % |
|---|---|
| Reedmergnerite | 37 |
| Albite | 8 |
| Potassium reedmergnerite | 16 |
| Danburite | 8 |
| Cordierite | 0 |
| Willemite | 0 |
| Silicon dioxide | 31 |
| Diboron trioxide | 8 |
| Pekovite | 0 |
| Maleevite | 0 |

This glass has the following further properties:
1. By solving the system of equations (1) a pH=8.76 is obtained if 50 μmol are dissolved in 1 liter neutral water.
2. The number of angular degrees of freedom per atom calculated according to (3) is thus 0.35, which in turn according to (2) results in an ablation rate of 135 mg/(dm²3 h).
3. The average potential well depth calculated according to (4) is 1612 kJ/mol, which in turn according to (5) results in a thermal expansion of 4.94 ppm/K.

Furthermore, the pass-over of water vapor is adjusted in example 1 during the production such that the total content of boron at the surface is at least 80% of the content of boron in the interior of the glass.

Example 2

The second example is a glass that also contains a high proportion of diboron trioxide (6%) in view of ablation of boron and boron compounds in the hot forming region being as low as possible. It has the composition:

TABLE 12

| Constituent phase | Proportion/mol % |
|---|---|
| Reedmergnerite | 42 |
| Albite | 12 |
| Potassium reedmergnerite | 9 |
| Danburite | 0 |
| Cordierite | 0 |
| Willemite | 0 |
| Silicon dioxide | 31 |
| Diboron trioxide | 6 |
| Pekovite | 0 |
| Maleevite | 0 |

The glass has the following properties:
1. By solving the system of equations (1) a pH=8.79 is obtained if 50 μmol are dissolved in 1 liter neutral water.
2. The number of angular degrees of freedom per atom calculated according to (3) is thus 0.31, which in turn according to (2) results in an ablation rate of 117 mg/(dm²3 h).
3. The average potential well depth calculated according to (4) is 1612 kJ/mol, which in turn according to (5) results in a thermal expansion of 4.94 ppm/K.

Furthermore, the pass-over of water vapor is adjusted in example 2 during the production such that the total content of boron at the surface is at least 80% of the content of boron in the interior of the glass.

Example 3

The third example is also a glass that contains a significant proportion of diboron trioxide (4%) in view of a low ablation of boron and boron compounds in the hot forming region. It has the composition:

TABLE 13

| Constituent phase | Proportion/mol % |
|---|---|
| Reedmergnerite | 40 |
| Albite | 8 |
| Potassium reedmergnerite | 16 |
| Danburite | 0 |
| Cordierite | 0 |
| Willemite | 0 |
| Silicon dioxide | 32 |
| Diboron trioxide | 4 |
| Pekovite | 0 |
| Maleevite | 0 |

This glass has the following properties:
1. By solving the system of equations (1) a pH=8.81 is obtained if 50 µmol are dissolved in 1 liter neutral water.
2. The number of angular degrees of freedom per atom calculated according to (3) is thus 0.261, which in turn according to (2) results in an ablation rate of almost 100 mg/(dm$^2$3 h).
3. The average potential well depth calculated according to (4) is 1614 kJ/mol, which in turn according to (5) results in a thermal expansion of 4.90 ppm/K.

Furthermore, the pass-over of water vapor is adjusted in example 3 during the production such that the total content of boron at the surface is at least 80% of the content of boron in the interior of the glass.

Example 4

The fourth example is a glass, in which the thermal expansion has been slightly reduced in order to achieve a calculated ablation rate of about 95 mg/(dm$^2$3 h). A proportion of 4% diboron trioxide is contained in view of a low ablation of boron and boron compounds in the hot forming region. It has the composition:

TABLE 14

| Constituent phase | Proportion/mol % |
|---|---|
| Reedmergnerite | 36 |
| Albite | 10 |
| Potassium reedmergnerite | 10 |
| Danburite | 0 |
| Cordierite | 0 |
| Willemite | 0 |
| Silicon dioxide | 40 |
| Diboron trioxide | 4 |
| Pekovite | 0 |
| Maleevite | 0 |

This glass has the following properties:
1. By solving the system of equations (1) a pH=8.76 is obtained if 50 µmol are dissolved in 1 liter neutral water.
2. The number of angular degrees of freedom per atom calculated according to (3) is thus 0.245, which in turn according to (2) results in an ablation rate of 95.3 mg/(dm$^2$3 h) at the test according to ISO 695.
3. The average potential well depth calculated according to (4) is 1639 kJ/mol, which in turn according to (5) results in a thermal expansion of 4.41 ppm/K.

Example 5

The fifth example is a glass that has a low calculated ablation rate of less than 105 mg/(dm$^2$3 h). A proportion of 4% diboron trioxide is contained in view of a low ablation of boron and boron compounds in the hot forming region. It has the composition:

TABLE 15

| Constituent phase | Proportion/mol % |
|---|---|
| Reedmergnerite | 36 |
| Albite | 6 |
| Potassium reedmergnerite | 6 |
| Danburite | 0 |
| Cordierite | 0 |
| Willemite | 0 |

TABLE 15-continued

| Constituent phase | Proportion/mol % |
|---|---|
| Silicon dioxide | 48 |
| Diboron trioxide | 4 |
| Pekovite | 0 |
| Maleevite | 0 |

This glass has the following properties:
1. By solving the system of equations (1) a pH=8.69 is obtained if 50 µmol are dissolved in 1 liter neutral water.
2. The number of angular degrees of freedom per atom calculated according to (3) is thus 0.224, which in turn according to (2) results in an ablation rate of 89.7 mg/(dm$^2$3 h).
3. The average potential well depth calculated according to (4) is 1665 kJ/mol, which in turn according to (5) results in a thermal expansion of 3.9 ppm/K.

Furthermore, the pass-over of water vapor is adjusted in example 5 during the production such that the total content of boron at the surface is at least 80% of the content of boron in the interior of the glass.

Example 6

As compared to example 5, the sixth example is a glass having an even lower calculated ablation rate of about 80 mg/(dm$^2$3 h) and a lower pH. A proportion of 2% diboron trioxide is contained in view of a low ablation of boron and boron compounds in the hot forming region. It has the composition:

TABLE 16

| Constituent phase | Proportion/mol % |
|---|---|
| Reedmergnerite | 34 |
| Albite | 8 |
| Potassium reedmergnerite | 8 |
| Danburite | 0 |
| Cordierite | 0 |
| Willemite | 0 |
| Silicon dioxide | 48 |
| Diboron trioxide | 2 |
| Pekovite | 0 |
| Maleevite | 0 |

This glass has the following properties:
1. By solving the system of equations (1) a pH=8.73 is obtained if 50 µmol are dissolved in 1 liter neutral water.
2. The number of angular degrees of freedom per atom calculated according to (3) is thus 0.1807, which in turn according to (2) results in an ablation rate of 80.1 mg/(dm$^2$3 h).
3. The average potential well depth calculated according to (4) is 1665 kJ/mol, which in turn according to (5) results in a thermal expansion of 3.91 ppm/K.

Example 7

As compared to example 6, the seventh example is a glass having an even lower calculated ablation rate of less than 75 mg/(dm$^2$3 h). Diboron trioxide is not contained. The composition is:

TABLE 17

| Constituent phase | Proportion/mol % |
| --- | --- |
| Reedmergnerite | 37 |
| Albite | 4 |
| Potassium reedmergnerite | 9 |
| Danburite | 0 |
| Cordierite | 0 |
| Willemite | 1 |
| Silicon dioxide | 49 |
| Diboron trioxide | 0 |
| Pekovite | 0 |
| Maleevite | 0 |

This glass has the following properties:
1. By solving the system of equations (1) a pH=8.73 is obtained if 50 µmol are dissolved in 1 liter neutral water.
2. The number of angular degrees of freedom per atom calculated according to (3) is thus 0.131, which in turn according to (2) results in an ablation rate of 72 mg/(dm$^2$3 h).
3. The average potential well depth calculated according to (4) is 1665 kJ/mol, which in turn according to (5) results in a thermal expansion of 3.9 ppm/K.

Furthermore, the pass-over of water vapor is adjusted in example 7 during the production such that the total content of boron at the surface is at least 80% of the content of boron in the interior of the glass.

Example 8

As compared to example 6, the eighth example is a glass having a higher calculated ablation rate of about 85 mg/(dm$^2$3 h), however, on the other hand also a higher thermal expansion. The composition is:

TABLE 18

| Constituent phase | Proportion/mol % |
| --- | --- |
| Reedmergnerite | 27 |
| Albite | 9 |
| Potassium reedmergnerite | 12 |
| Danburite | 0 |
| Cordierite | 0 |
| Willemite | 4 |
| Silicon dioxide | 44 |
| Diboron trioxide | 2 |
| Pekovite | 2 |
| Maleevite | 0 |

This glass has the following properties:
1. By solving the system of equations (1) a pH=8.87 is obtained if 50 µmol are dissolved in 1 liter neutral water.
2. The number of angular degrees of freedom per atom calculated according to (3) is thus 2.07, which in turn according to (2) results in an ablation rate of 85.5 mg/(dm$^2$3 h).
3. The average potential well depth calculated according to (4) is 1639 kJ/mol, which in turn according to (5) results in a thermal expansion of 4.4 ppm/K.

Example 9

As compared to example 8, the ninth example is a glass combining an even higher calculated ablation rate of about 90 mg/(dm$^2$3 h) with an even higher coefficient of expansion of about 5 ppm/K. The composition is:

TABLE 19

| Constituent phase | Proportion/mol % |
| --- | --- |
| Reedmergnerite | 32 |
| Albite | 10 |
| Potassium reedmergnerite | 10 |
| Danburite | 1 |
| Cordierite | 0 |
| Willemite | 6 |
| Silicon dioxide | 38 |
| Diboron trioxide | 2 |
| Pekovite | 1 |
| Maleevite | 0 |

This glass has the following properties:
1. By solving the system of equations (1) a pH=8.93 is obtained if 50 µmol are dissolved in 1 liter neutral water.
2. The number of angular degrees of freedom per atom calculated according to (3) is thus 0.228, which in turn according to (2) results in an ablation rate of 90.7 mg/(dm$^2$3 h).
3. The average potential well depth calculated according to (4) is 1614 kJ/mol, which in turn according to (5) results in a thermal expansion of 4.91 ppm/K.

Example 10

The tenth example is a glass combining a low calculated ablation rate of less than 100 mg/(dm$^2$3 h) with a coefficient of expansion of about 5.5 ppm/K and having a diboron trioxide content of 2 mol %. The composition is:

TABLE 20

| Constituent phase | Proportion/mol % |
| --- | --- |
| Reedmergnerite | 38 |
| Albite | 6 |
| Potassium reedmergnerite | 12 |
| Danburite | 4 |
| Cordierite | 0 |
| Willemite | 6 |
| Silicon dioxide | 29 |
| Diboron trioxide | 2 |
| Pekovite | 3 |
| Maleevite | 0 |

This glass has the following properties:
1. By solving the system of equations (1) a pH=8.99 is obtained if 50 µmol are dissolved in 1 liter neutral water.
2. The number of angular degrees of freedom per atom calculated according to (3) is thus 0.249, which in turn according to (2) results in an ablation rate of 96.6 mg/(dm$^2$3 h).
3. The average potential well depth calculated according to (4) is 1589 kJ/mol, which in turn according to (5) results in a thermal expansion of 5.4 ppm/K.

Furthermore, the pass-over of water vapor is adjusted in example 10 during the production such that the total content of boron at the surface is at least 80% of the content of boron in the interior of the glass.

Example 11

As compared to example 10, the eleventh example is a glass having a comparable calculated ablation rate according to (2), however, a higher thermal expansion coefficient. The composition is:

TABLE 21

| Constituent phase | Proportion/mol % |
|---|---|
| Reedmergnerite | 26 |
| Albite | 4 |
| Potassium reedmergnerite | 47 |
| Danburite | 0 |
| Cordierite | 0 |
| Willemite | 2 |
| Silicon dioxide | 19 |
| Diboron trioxide | 2 |
| Pekovite | 0 |
| Maleevite | 0 |

This glass has the following properties:
1. By solving the system of equations (1) a pH=8.94 is obtained if 50 μmol are dissolved in 1 liter neutral water.
2. The number of angular degrees of freedom per atom calculated according to (3) is thus 0.250, which in turn according to (2) results in an ablation rate of 96.7 mg/(dm$^2$3 h).
3. The average potential well depth calculated according to (4) is 1565 kJ/mol, which in turn according to (5) results in a thermal expansion of 5.91 ppm/K.

Furthermore, the pass-over of water vapor is adjusted in example 11 during the production such that the total content of boron at the surface is at least 80% of the content of boron in the interior of the glass.

Example 12

Example 12 exists as test melt as well based on which the theoretical considerations described herein have been verified. The composition is:

TABLE 22

| Constituent phase | Proportion/mol % |
|---|---|
| Reedmergnerite | 32.2 |
| Albite | 24.7 |
| Potassium reedmergnerite | 0 |
| Danburite | 6.7 |
| Cordierite | 0 |
| Willemite | 0 |
| Silicon dioxide | 32.6 |
| Diboron trioxide | 3.8 |
| Pekovite | 0 |
| Maleevite | 0 |

This glass has the following properties:
1. By solving the system of equations (1) a pH=8.86 is obtained if 50 μmol are dissolved in 1 liter neutral water.
2. The number of angular degrees of freedom per atom calculated according to (3) is thus 0.275, which in turn according to (2) results in an ablation rate of 104 mg/(dm$^2$3 h).
3. The average potential well depth calculated according to (4) is 1620 kJ/mol, which in turn according to (5) results in a thermal expansion of 4.8 ppm/K.

Example 13

Example 13 originates from example 12 by transferring two percent of each of silicon dioxide and diboron trioxide to danburite. The aim is to reduce the alkali resistance without the pH increasing to more than 9 or the expansion coefficient increasing to more than 6 ppm/K.

TABLE 23

| Constituent phase | Proportion/Mol % |
|---|---|
| Reedmergnerite | 32.2 |
| Albite | 24.7 |
| Potassium reedmergnerite | 0 |
| Danburite | 10.7 |
| Cordierite | 0 |
| Willemite | 0 |
| Silicon dioxide | 30.6 |
| Diboron trioxide | 1.8 |
| Pekovite | 0 |
| Maleevite | 0 |

This glass has the following properties:
1. By solving the system of equations (1) a pH=8.92 is obtained if 50 μmol are dissolved in 1 liter neutral water.
2. The number of angular degrees of freedom per atom calculated according to (3) is thus 0.239, which in turn according to (2) results in an ablation rate of 93.5 mg/(dm$^2$3 h) at the test according to ISO 695.
3. The average potential well depth calculated according to (4) is 1616 kJ/mol, which in turn according to (5) results in a thermal expansion of 4.8 ppm/K.

The ablation rates measured on corresponding test melts according to ISO 695 are 99 mg/(dm$^2$3 h) at the test melt of example 12 and 93 mg/(dm$^2$3 h) at the test melt of example 13, which matches the calculated values within the measurement errors.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass having a composition of constituent phases, said constituent phases comprising:
   reedmergnerite, from 9 to 80 mol %;
   albite, from 1 to 40 mol %;
   potassium reedmergnerite, from 0 to 60 mol %;
   danburite, from 0 to 30%;
   cordierite, from 0 to 20%;
   willemite, from 0 to 20%;
   silicon dioxide, from 0 to 65%;
   diboron trioxide, from 0 to 20%;
   pekovite, from 0 to 20%; and
   maleevite, from 0 to 25%,
   wherein the glass comprises surface glass and bulk glass and the total content of boron in the surface glass is at least 60% of the content of boron in the bulk glass and the content of boron in the surface glass is reduced in relation to the bulk glass by at least 1 mol %, wherein the surface glass is present in a depth of about 6 nm.

2. The glass according to claim 1, wherein the sum of proportions of reedmergnerite, potassium reedmergnerite and albite is at least 50 mol %, and wherein said constituent phases comprise:
   reedmergnerite, from 20 to 50 mol %;
   albite, from 15 to 40 mol %;
   potassium reedmergnerite, from 0 to 20 mol %;
   danburite, from 0 to 15%;
   cordierite, from 0 to 15%;

willemite, from 0 to 15%;
silicon dioxide, from 25 to 50%;
diboron trioxide, from 1 to 10%;
pekovite, from 0 to 10%; and
maleevite, from 0 to 10%.

3. The glass according to claim 1, wherein said constituent phases comprise:
reedmergnerite, from 9 to 50 mol %;
albite, from 1 to 15 mol %;
potassium reedmergnerite, from 0 to 20 mol %;
danburite, from 0 to 30%;
cordierite, from 0 to 20%;
willemite, from 0 to 20%;
silicon dioxide, from 25 to 65%;
diboron trioxide, from 0 to 10%;
pekovite, from 0 to 20%; and
maleevite, from 0 to 25%.

4. The glass according to claim 1, wherein a proportion of silicon dioxide is at most 50 mol %.

5. The glass according to claim 1, wherein a proportion of diboron trioxide is at most 15 mol %.

6. The glass according to claim 1, wherein a proportion of reedmergnerite in the glass is higher than a proportion of albite.

7. The glass according to claim 1, wherein a proportion of reedmergnerite in the glass is higher than a proportion of potassium reedmergnerite.

8. The glass according to claim 1, wherein the total content of boron in the surface glass is at least 80% of the content of boron in the bulk glass.

9. The glass according to claim 1, comprising a number of angular degrees of freedom of up to 0.339.

10. The glass according to claim 1, comprising a number of angular degrees of freedom of up to 0.328.

11. The glass according to claim 1, comprising a number of angular degrees of freedom of up to 0.304.

12. The glass according to claim 1, comprising a number of angular degrees of freedom less than 0.29.

13. The glass according to claim 1, comprising a thermal expansion of from 3 ppm/K to 7 ppm/K.

14. The glass according to claim 1, comprising a thermal expansion of from 4.5 ppm/K to 5.5 ppm/K.

15. The glass according to claim 1, wherein a pH-value of <8.99 results from dissolution of 50 µmol glass in neutral water.

16. The glass according to claim 1, wherein a pH-value of <8.79 results from dissolution of 50 µmol glass in neutral water.

17. The glass according to claim 1, wherein the glass has an ablation rate of at most 135 mg/(dm$^2$3 h).

18. The glass according to claim 1, wherein the glass has an ablation rate of at most 125 mg/(dm$^2$3 h).

19. The glass according to claim 1, wherein the glass has an average potential well depth of from 1515 kJ/mol to 1715 kJ/mol.

20. A glass having a composition of constituent phases, said constituent phases comprising:
reedmergnerite, from 10 to 80 mol %;
albite, from 1 to 40 mol %;
potassium reedmergnerite, from 0 to 60 mol %;
danburite, from 0 to 30%;
cordierite, from 0 to 20%;
willemite, from 0 to 20%;
silicon dioxide, from 0 to 65%;
diboron trioxide, from 0 to 20%;
pekovite, from 0 to 20%; and
maleevite, from 0 to 25%,
wherein a number of angular degrees of freedom per atom in a bulk of the glass is less than 0.25, and wherein the glass has an average potential well depth of from 1515 kJ/mol to 1634 kJ/mol.

21. A process for producing a glass, comprising:
melting a plurality of glass raw materials to form a glass melt, the plurality of glass raw materials including
reedmergnerite, from 10 to 80 mol %,
albite, from 1 to 40 mol %,
potassium reedmergnerite, from 0 to 60 mol %,
danburite, from 0 to 30%,
cordierite, from 0 to 20%,
willemite, from 0 to 20%,
silicon dioxide, from 0 to 65%,
diboron trioxide, from 0 to 20%,
pekovite, from 0 to 20%, and
maleevite, from 0 to 25%; and
cooling of the glass melt.

22. The process according to claim 21, further comprising:
after melting the plurality of glass raw materials to form the glass melt, forming a glass article from the glass melt.

23. The process according to claim 22, wherein the glass article is a glass tube.

24. The process according to claim 22, the process further comprising:
applying a water vapor containing gas to the glass during at least one of the forming and melting.

25. The process according to claim 21, the process further comprising applying a water vapor containing gas to the glass during the melting.

* * * * *

UNITED STATES PATENT AND TRADEMARK OFFICE
CERTIFICATE OF CORRECTION

PATENT NO. : 10,822,265 B2
APPLICATION NO. : 15/892029
DATED : November 3, 2020
INVENTOR(S) : Fotheringham et al.

It is certified that error appears in the above-identified patent and that said Letters Patent is hereby corrected as shown below:

In the Specification

Column 5
At Line 53, under System of Equations, please delete equation 2 and substitute therefore
--$[H_3SiO_4^-][H^+] / [H_4SiO_4] = 10^{-pka}$,--.

Signed and Sealed this
Fifteenth Day of November, 2022

Katherine Kelly Vidal
*Director of the United States Patent and Trademark Office*